United States Patent [19]

Phillips

[11] Patent Number: 4,918,518

[45] Date of Patent: Apr. 17, 1990

[54] METHOD AND APPARATUS FOR THE RECORDING AND REPLAY OF INTERLACED SIGNALS

[75] Inventor: Larry G. Phillips, Knoxville, Tenn.

[73] Assignee: North American Philips Corporation, New York, N.Y.

[21] Appl. No.: 209,452

[22] Filed: Jun. 15, 1988

[51] Int. Cl.[4] .......................... H04N 5/04; H04N 5/262

[52] U.S. Cl. ..................................... 358/148; 358/22; 358/142; 358/183

[58] Field of Search .................... 358/11, 22, 140, 148, 358/149, 150, 154, 160, 183

[56] References Cited

U.S. PATENT DOCUMENTS

| | | | |
|---|---|---|---|
| 4,249,213 | 2/1981 | Imaide et al. | 358/183 |
| 4,665,438 | 5/1987 | Miron et al. | 358/183 |
| 4,683,495 | 7/1987 | Brock | 358/148 |
| 4,724,487 | 2/1988 | Casey | 358/183 |
| 4,750,038 | 6/1988 | Welles et al. | 358/183 |

FOREIGN PATENT DOCUMENTS 0156420 12/1979 Japan ................................ 358/183

Primary Examiner—John W. Shepperd
Assistant Examiner—Michael D. Parker
Attorney, Agent, or Firm—Algy Tamoshunas; Marianne R. Rich

[57] ABSTRACT

Either one of the fields of an interlaced television signal is designated as top field as indicated by a first selector signal. The presence of a second selector signal indicates bottom field. A regenerated vertical synchronization signal is furnished for the first horizontal synchronization signal following vertical synchronization in top field. This regenerated vertical synchronization signal resets a counter which counts horizontal synchronization signals repetitively to a count of five. A second regenerated vertical synchronization signal is furnished when the count of five is reached following the vertical synchronization signal of bottom field. The counter is reset by each first regenerated vertical synchronization signal. When a synchronization signal which would normally be designated top field occurs within a predetermined window around horizontal synchronization, the subsequent field is designated top field, i.e. a field switch takes place.

28 Claims, 6 Drawing Sheets

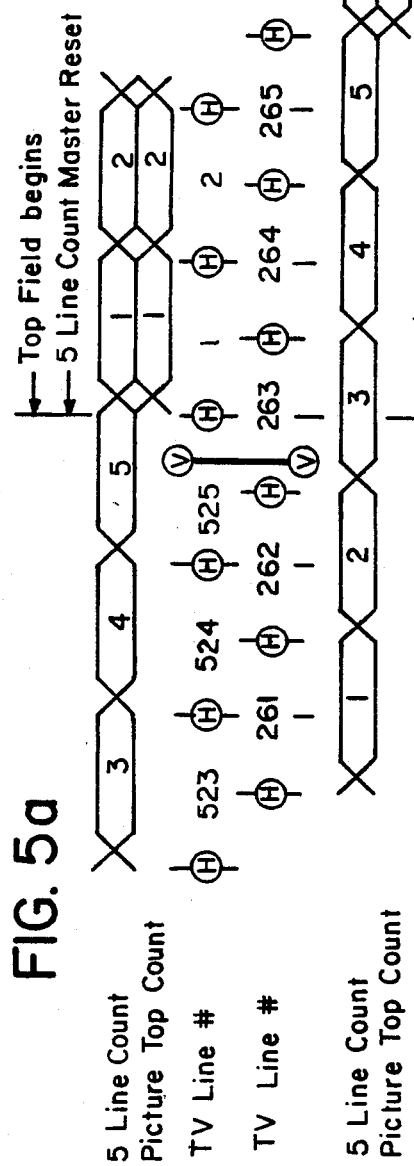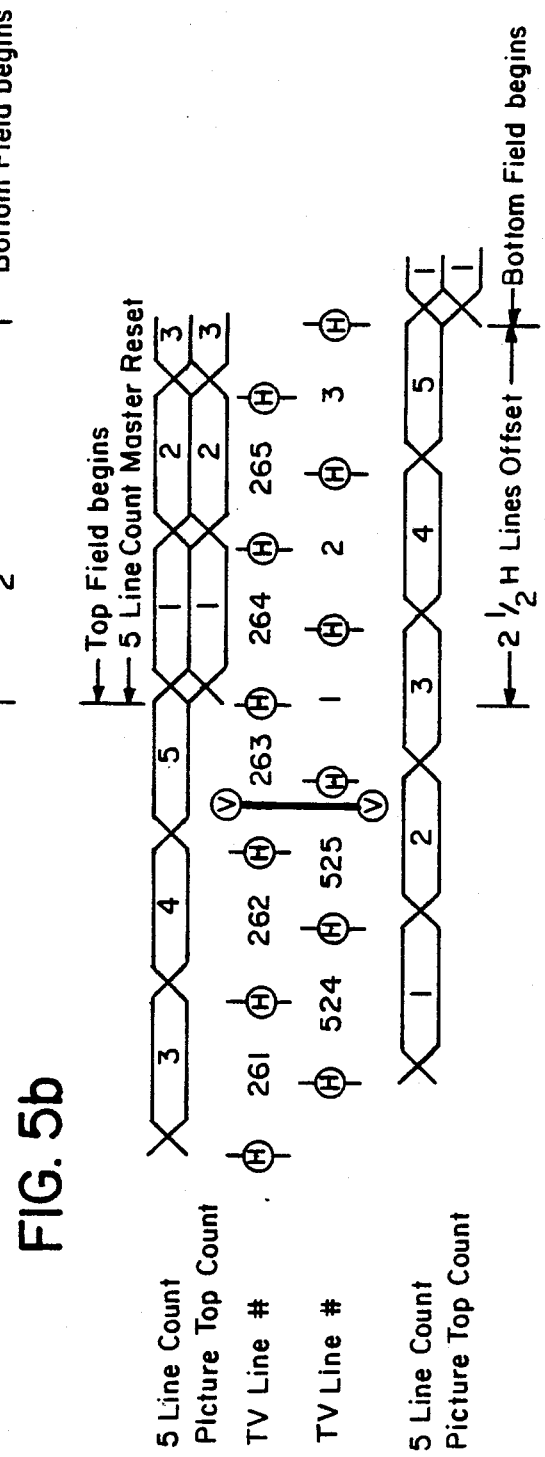
FIG. 5a
FIG. 5b

METHOD AND APPARATUS FOR THE RECORDING AND REPLAY OF INTERLACED SIGNALS

FIELD OF THE INVENTION

The present invention relates to a method and apparatus for recording and replaying interlaced signals such as, for example, televisions signals.

BACKGROUND OF THE INVENTION

Since the present invention will be described with reference to a television receiver having a picture-in-picture (PIP) feature, basic television theory insofar as required for a thorough understanding of the invention will be briefly summarized here.

One complete TV picture is called a frame and is composed of two fields which are offset both temporally and spatially as shown in FIG. 1. At the TV receiver the fields must be interlaced in the correct order to reconstruct the transmitted picture. This is accomplished by offsetting vertical synchronization relative to horizontal synchronization by half a horizontal line from field to field as shown in FIG. 2. The vertical synchronization pulse leading edge coincides with horizontal synchronization in field one whereas the leading edge in field two is halfway across the horizontal line. Vertical synchronization is detected in the TV receiver by an integration process or a countdown process which destroys the exact relationship between horizontal and vertical synchronization as described above, although the half line offset is maintained. This is sufficient for TV receiver interlace, but makes field detection (i.e. determining which field is the even field and which field is the odd field when both fields are to be stored in, or read from memory) difficult.

SUMMARY OF THE INVENTION

The object of the present invention is to assure that a baseband interlaced video signal is written into memory and read from memory in a manner which preserves the temporal and spatial relationships between the lines of the two fields. This is to be accomplished without requiring identification of the even and odd fields in the received signal.

Another object of the present invention is to provide a method and apparatus in which interlace errors due to crossing of the vertical synchronization signal over a horizontal synchronization signal (vertical jitter) are minimized.

Finally, the present record and read-out method and apparatus should be compatible with both NTSC and PAL systems.

In accordance with the present invention, the horizontal and vertical synchronization signals are separated from an incoming interlaced signal having an odd field and an even field. A regenerated vertical synchronization signal is furnished in response to the first horizontal synchronization signal following a vertical synchronization signal in alternate fields. These alternate fields are considered top fields. This regenerated vertical synchronization signal also resets a counter. The counter counts horizontal synchronization signals to a count of five repetitively. In the remaining fields, herein called bottom fields, the regenerated vertical synchronization signal is furnished in response to the horizontal synchronization signal following the count of five on the above-mentioned counter after receipt of a vertical synchronization signal. It should be noted that, according to the present invention, it makes no difference whether the even field or the odd field becomes top field. The field assignment may even be switched during operation as will be shown below.

In a preferred embodiment, a horizontal window signal blocks any vertical synchronization signal occurring within predetermined proximity of a horizontal synchronization signal. This blocking prevents a field change from bottom to top field. This change is then carried out upon receipt of the next vertical synchronization signal. In other words, when a vertical synchronization signal occurs too closely to a horizontal synchronization signal, a field switch occurs. The field which previously was bottom field becomes top field and vice versa.

The foregoing and other objects, aspects and advantages of the invention will be better understood from the following description when read in conjunction with the drawing.

BRIEF DESCRIPTION OF THE DRAWINGS

FIGS. 5a and 5b are timing diagrams illustrating the basic method of the present invention;

DESCRIPTION OF THE PREFERRED EMBODIMENT

Figure 1:
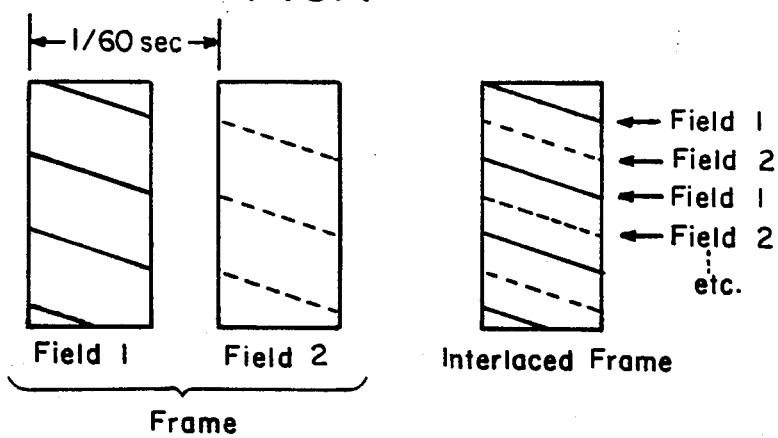
FIG. 1 illustrates the fields together constituting a frame of an interlaced television picture.
Figure 2:
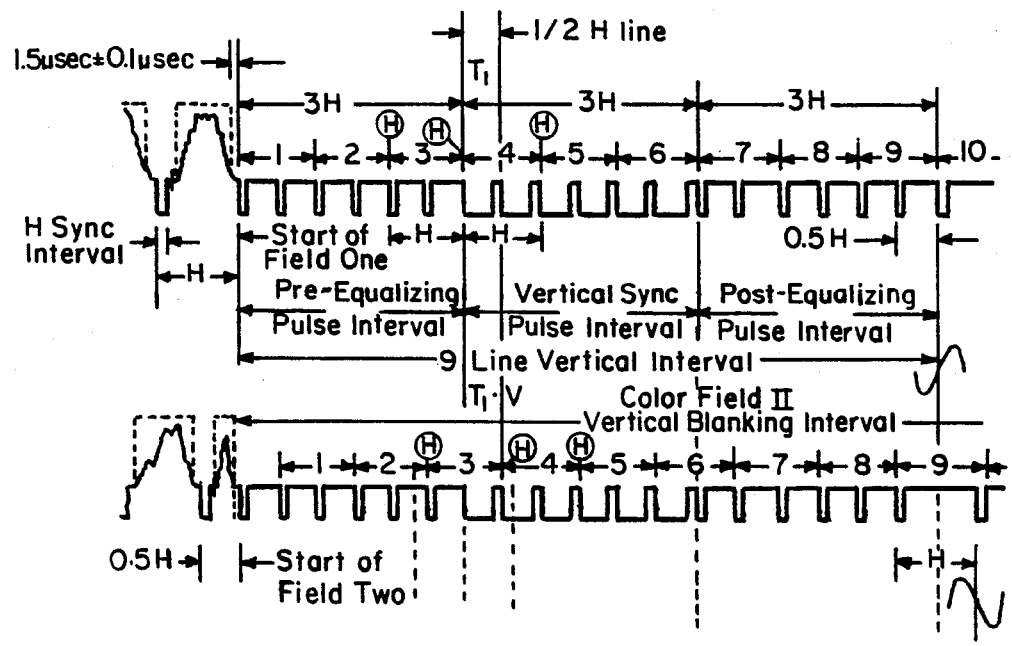
FIG. 2 illustrates the relative position of vertical and horizontal synchronization signals in sequential fields.
Figure 3A:
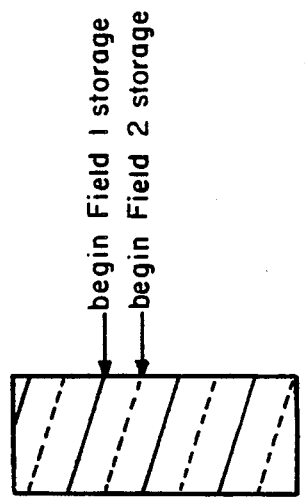
FIGS. 3a and 3b illustrate the interchangeability of field 1 and field 2, as top and bottom field in an interlaced television signal.
Figure 3B:
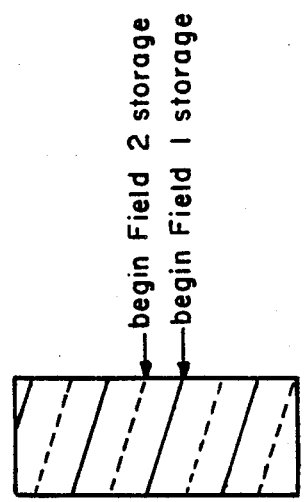

The basic concept underlying the present invention is illustrated in FIG. 3a and 3b. In FIG. 3a, the storage process was begun with a line in field 1. The top line of field 2 is spatially below the top line of field 1 in storage, as are all subsequent lines of field 2 below the respective lines of field 1. Therefore field 1 is top field and field 2 is bottom field. Similarly, in FIG. 3b field 1 is spatially below field 2. Therefore field 1 is bottom field and field 2 is top field. It will be noted that which is top field and which is bottom field makes no difference as long as lines of field 1, for example, which were stored above lines of field 2, retain that position in the final display, and vice versa.

The specific embodiment of the invention to be described is that of a field generator incorporated in a picture-in-picture (PIP) television system. Only those portions of a PIP system required for understanding of the present invention will be described.

In a PIP system wherein a television signal from a second channel or another source is sub-sampled to decrease its size and displayed within a larger television signal. Specifically, in the vertical direction, every third line is maintained, while the remaining two lines are dropped. Similarly, the picture is horizontally sub-sampled so as to decrease its width. This reduced picture is stored in memory in write cycles controlled by the PIP synchronization signals.

In order to be displayed as part of the main TV signal, the PIP signal must then be read from memory in synchronization with the main signal. The signal read from memory must then be combined with the main TV signal (herein, as an example, the main luminance signal) to yield a main luminance signal with inserted PIP.

Figure 4:
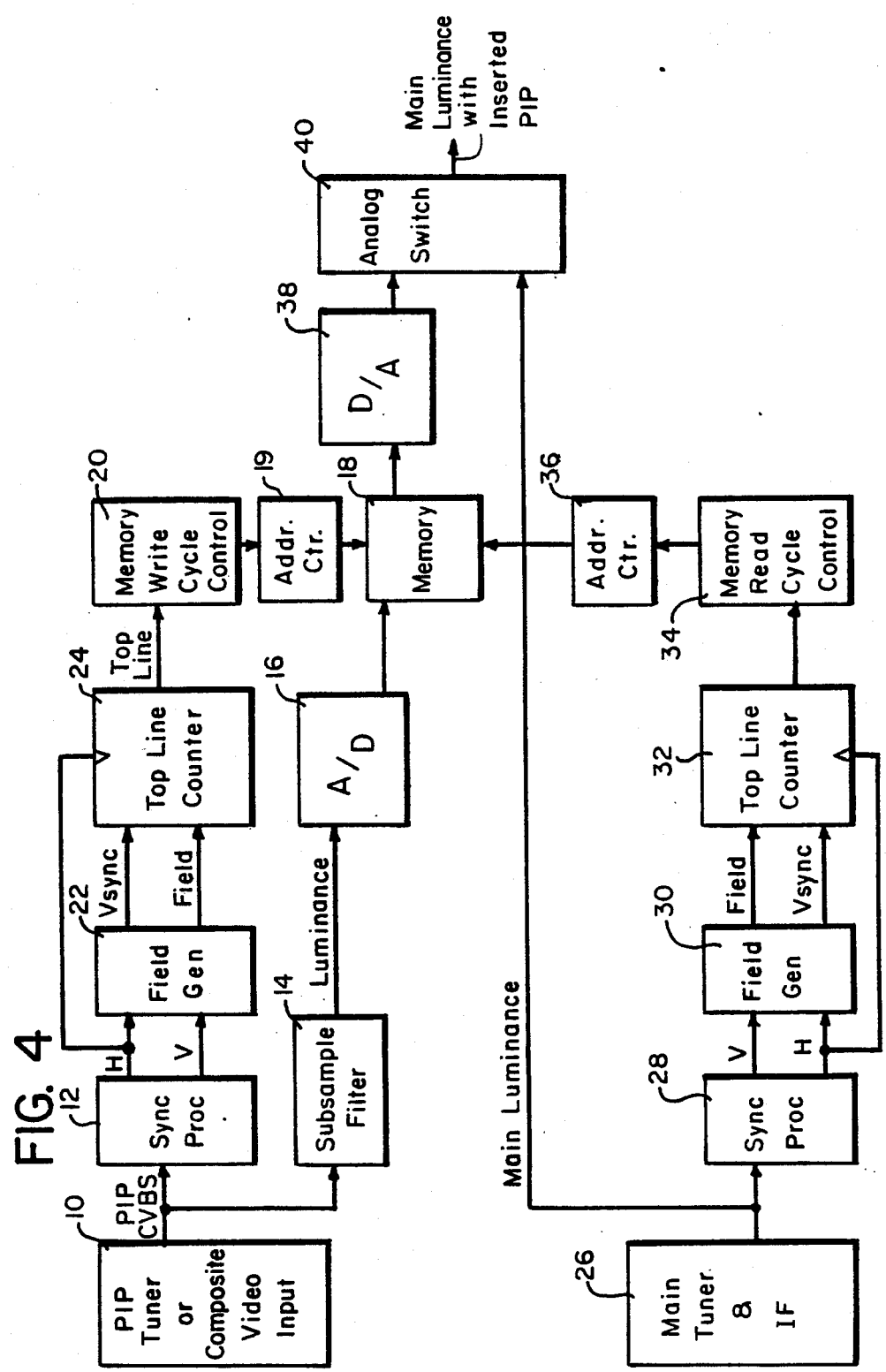
FIG. 4 is a block diagram of the present invention interconnected with a picture-in-picture (PIP) system.

The overall diagram of the PIP system using an analog switch and incorporating the field generator of the present invention is illustrated in FIG. 4. In that figure, a PIP tuner and demodulator 10 furnishes a PIP baseband signal. A synchronization signal processor 12 removes the horizontal (H) and vertical (V) synchronization pulses from the baseband signal. At the same time, the luminance signal is extracted and applied to a sub-sample filter 14. The output of the sub-sample filter is subjected to analog/digital conversion. The output of analog/digital converter 16 is recorded in a memory 18 at addresses generated by an address counter 19 under control of a memory write cycle control 20. Control 20 is operative partially under control of PIP H and V synchronization signals.

Interconnected between synchronization signal processor 12 and memory write cycle control 20 is a field generator 22 and a top line counter 24. The field generator constitutes an embodiment of the present invention. Field generator 22 receives the horizontal and vertical synchronization pulses from the output of synchronization signal processor 12. The output of field generator 22 includes a regenerated vertical synchronization signal, VSYNC, and a so-called selector signal whose function and origin will be described below. Both signals at the output of field generator 22 are applied to a top line counter 24, also to be described below, which further receives the horizontal synchronization signals at the output of synchronization signal processor 12. The output of top line counter 24 is a top line signal which forms part of the control for memory write cycle control 20.

The main signal into which the PIP signal is to be incorporated is received at a main tuner and demodulator 26, similar in all respects to PIP tuner 10 if both PIP and main signals are broadcast signals. The output of stage 26 is a baseband signal which is subjected to synchronization signal separation in a stage 28. The output signals, V and H, are applied to a field generator 30 substantially identical to field generator 22. The output of this field generator, as was the output of field generator 22, are a selector signal and a regenerated vertical synchronization signal VSYNC. These signals are applied to a top line counter 32. Top line counter 32 also receives the main horizontal synchronization signal. The output of top line counter 32 is applied to a memory read cycle control stage 34. The output of stage 34 controls the read-out from memory 18.

The output from memory 18, furnished under control of stage 34, is applied to a digital/analog converter 38, whose output, in turn is applied to an analog switch 40. The second input to analog switch 40 is the main luminance signal derived from stage 26. The output of analog switch 40 is thus a main luminance signal with inserted PIP.

Alternatively, the main and PIP signals could be combined digitally in a multiplexing stage, and the output of the multiplexer be subjected to digital/analog conversion. The particular method or apparatus for combining the two signals is not part of the present invention. The problem addressed by the present invention is recording in, and readout from memory 18 so that the resultant PIP picture is correctly interlaced.

Before describing the operation and construction of the two field generators and top line counters, reference will be made to FIGS. 5a and 5b which illustrate that either field 1 or field 2 may be top field when an interlaced picture is stored in/read out from memory.

A five line counter which counts five horizontal lines repetitively is used. Since the number of lines per frame is divisible by five for both NTSC and PAL systems, the field generator will be compatible with both of these TV systems. This five line counter is reset by the first horizontal synchronization signal after the vertical synchronization signal for every other field. The field on which the reset operation occurs becomes the top field. Thus, according to the top line of FIG. 5a, field 1 is the top field, while in FIG. 5b, field 2 is the top field.

For alternate fields there is no reset for the first horizontal synchronization signal following vertical synchronization. The top-to-bottom field change occurs when the five line counter reaches the count of 5 following receipt of the next vertical synchronization signal. As illustrated, FIGS. 5a and 5b, since there are 262½ lines per field, the next vertical synchronization signal will be received on count 2½ of the five line counter. The count of 5, i.e. the indicated start of bottom field, will take place 2½ counts later. Since the desired offset between top and bottom field is ½ a horizontal line for the main channel and 1½ horizontal lines for the PIP channel, a one or two line correction is required. How this is achieved will be explained during the description of the operation and construction of the field generator and top line counter below.

It should, however, be noted that the time relationship between the horizontal and vertical synchronization signals is irrelevant on the bottom field since the selector signal will always change in response to the horizontal synchronization signal following the count of five on the counter.

Figure 6:
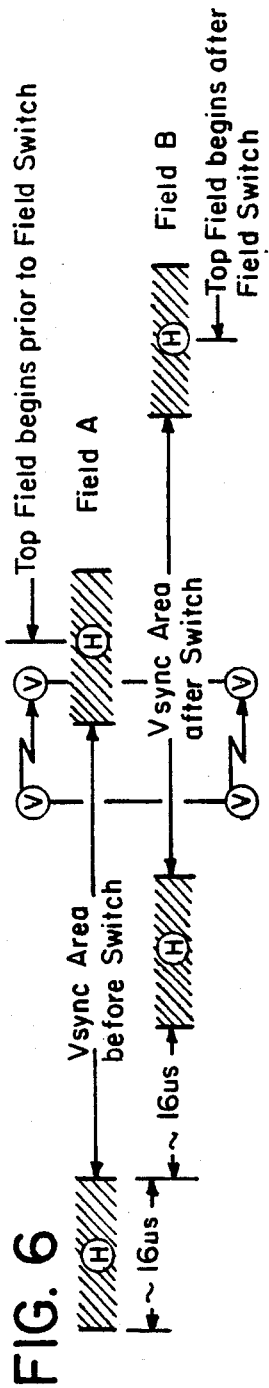
FIG. 6 is a time diagram illustrating a field switch.

On the top field, however, movement of the vertical synchronization signal across the horizontal synchronization signal can cause interlace errors. It is therefore desired that the V signal at the input of the field generator become effective only if outside of a certain time zone (shaded area in FIG. 6) around the horizontal synchronization signal. This time zone should be sufficiently large that there is little probability of the V signal jumping back and forth across it. On the other hand, as will be discussed below, an interlace error may occur when the V signal moves into the shaded area. Thus, a compromise must be reached. In a preferred embodiment, the shaded area is about one fourth of the horizontal line or approximately 16 microseconds.

Figure 7:
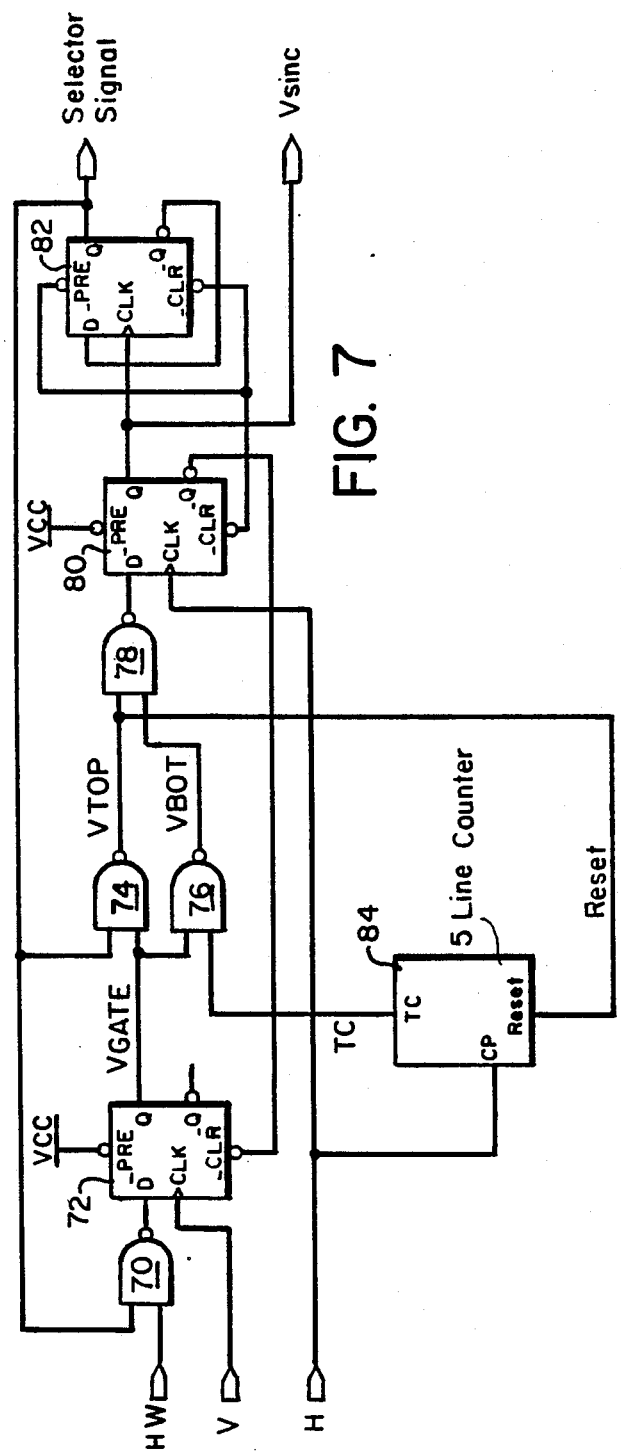
FIG. 7 is a schematic diagram illustrating a field generator of the present invention.
Figure 8B:
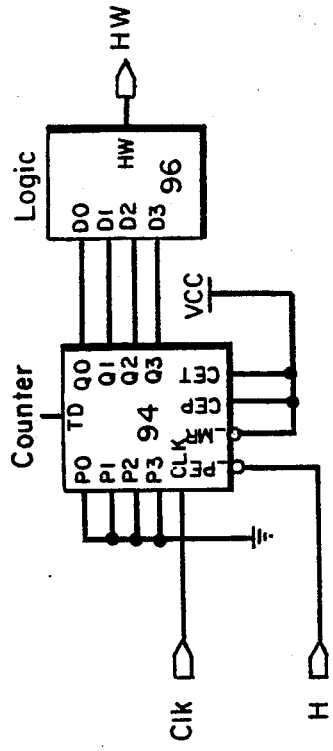
FIG. 8b is a horizontal window generator.

The horizontal window signal (HW) applied to the field generator illustrated in FIG. 7 creates this zone. One possible circuit for generating the HW signal is illustrated in FIG. 8(b). The H signals and a clock signal with a frequency at least 5 times $f_H$ are applied to a counter 94. The HW signal is generated by decoding the counter outputs as represented by the logic block 96 in the figure.

Referring again to FIGS. 6 and 7, it should be noted that the horizontal window will block any V signal occurring during the time HW is high and the field output is high from the field generator. Thus, for the position (timing) of the vertical synchronization signal relative to the horizontal synchronization signal illustrated for the right most "v" in field A of FIG. 6, no field change would occur. This constitutes an interlace error which is, however, corrected at the start of the next field.

When vertical synchronization signal occurs in the vicinity of the horizontal synchronization signal in one field, its position in the next field will be approximately half way between two horizontal synchronization pulses. Since the change from bottom field to top field which was to occur in field A did not take place, this change will be carried out for field B. In other words, field B, which was previously the bottom field, will now be the top field. This constitutes a field switch. However, the error introduced by failure to change to the top field for field A lasts only for the duration of field A and is immediately corrected by field B becoming the top field upon occurrence of the next vertical synchronization signal. Further, the situation where the vertical synchronization signal occurs within the shaded area generally takes place only when the equipment is first turned on. At that time, an interlace error which lasts only 1/60th of a second is completely unnoticeable.

The construction and operation of the field generator will now be explained. A schematic diagram of the field generator is illustrated in FIG. 7. This field generator has three inputs, namely a horizontal window input HW, a vertical synchronization input V and a horizontal synchronization input H. The horizontal window input is applied to a first input of a NAND gate 70 whose output is applied to the D input of a flip-flop 72. The clock input of flip-flop 72 receives the vertical synchronization signal. The Q output of flip-flop 72 is connected to the first input of a NAND gate 74 and the first input of a NAND gate 76. The output of NAND gate 74 is denoted by "VTOP" and constitutes a field signal which is applied as an input to a NAND gate 78. The second input to NAND gate 78 is the "VBOT" signal (also a field signal) derived from the output of NAND gate 76. The output of NAND gate 78 is connected to the D input of a flip-flop 80 whose clock input receives the horizontal synchronization signals. The Q output of flip-flop 80 is connected to the clock input of a flip-flop 82. The Q output of flip-flop 82 is the selector signal. This signal is 0 for top field, 1 for bottom field. These 0 and 1 signals are also called the first and second selector signals, respectively, herein. The selector signal is fed back to the second input of NAND gate 70 and the second input of NAND gate 74.

The horizontal synchronization signal is also applied to the clock input of a five line counter 84. Counter 84 has a terminal count output connected to the second input of NAND gate 76. The output of NAND gate 74 is connected to the reset input of counter 84.

The above-described field generator operates as follows:

During the time of a horizontal window, the first (HW) input to NAND gate 70 is low. The output of NAND gate 70 will thus be high, independent of the field signal. The next V signal will therefore cause the VGATE output of flip-flop 72 to be high. The output of NAND gate 74 will thus be 1 during the top field, and 0 during the bottom field until flip-flop 72 is reset. On the other hand, the output of NAND gate 76 will be 1 until the terminal count on counter 84 occurs, at which time it will go to 0. It will remain at 0 till the next count on counter 84, since, as will be shown below, flip-flop 72 is not reset until later.

Now, assuming first that the system is in the top field, i.e. the output of both NAND gate 74 and NAND gate 76 is 1, then the output of NAND gate 78 is 0 and no further action occurs until counter 84 reaches its terminal count. At that time NAND gate 76 switches to 0, causing the output of NAND gate 78 to switch to a 1. The next horizontal synchronization (H) signal clocks the 1 signal appearing at the D input of flip-flop 80 to its output, causing the VSYNC (regenerated vertical synchronization) signal to be generated and flip-flop 82 to switch to the state in which the selector signal signifying bottom field, i.e. a 1 at its Q output, is furnished. The switching of flip-flop 80 also resets flip-flop 72, which brings the VGATE signal at the output of flip-flop 72 to 0. This cause the output of NAND gates 74 and 76 to be 1, independent of the field and independent of the count on five line counter 84. Flip-flop 80 is set to 0 by next H signal, causing the VSYNC output to return to 0 and the output of flip-flop 82 to remain unchanged until the next vertical synchronization signal is received. VSYNC is thus active for the duration of one line during the bottom field.

When a V signal arrives while HW is low, and a 1 is at the output of flip-flop 82, the output of NAND gate 74 will be 0, while the output of NAND gate 76 will be a 1. The output of NAND gate 78 is thus 1. Upon receipt of the next horizontal synchronization signal, the 1 at the set input of flip-flop 80 will be transferred to its Q output. The VSYNC signal will thus be generated and flip-flop 82 will change state. Reset of flip-flop 72 will take place as discussed above, causing the VGATE signal to go to 0. It will be noted that the switch of flip-flop 82 took place upon receipt of the first horizontal synchronization signal following vertical synchronization. The VSYNC signal which, as above, is maintained for one line, has also occurred upon receipt of the first horizontal synchronization signal following vertical synchronization.

On the other hand, as discussed above, the VSYNC signal was delayed by 2½ counts relative to vertical synchronization for the bottom field. Since there should be only a one half line offset between the two fields for correct interlacing in the main field, and a 1½ line offset for PIP recording, correction must be made.

Figure 8A:
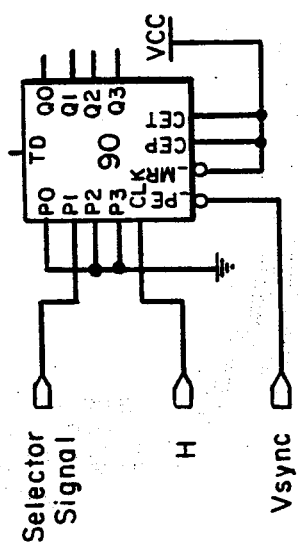
FIG. 8a illustrates a top line counter.

FIG. 8a illustrates a top line counter, i.e. boxes 24 and 32 in FIG. 4. The top line counter counts horizontal synchronization signals from the time it is loaded until it reaches the count representing the first active line for storage or display. At that time it generates the top line signal which initiates recording or readout.

Counter 90 is loaded by each VSYNC signal at the output of flip-flop 80 in FIG. 7.

Counter 90 has a clock input to which the horizontal synchronization signal is applied. It further has P0, P1, P2, and P3 inputs, all except P1 being connected to ground. P1 receives the selector signal, i.e. the output of flip-flop 82 in FIG. 7. Counter 90 also has four outputs, 0, 1, 2 and 3 respectively.

When the selector signal is a 1, indicating a bottom field, the VSYNC signal loads the counter with a two. On the other hand, during a top field, the counter is loaded with zero.

Figure 9:
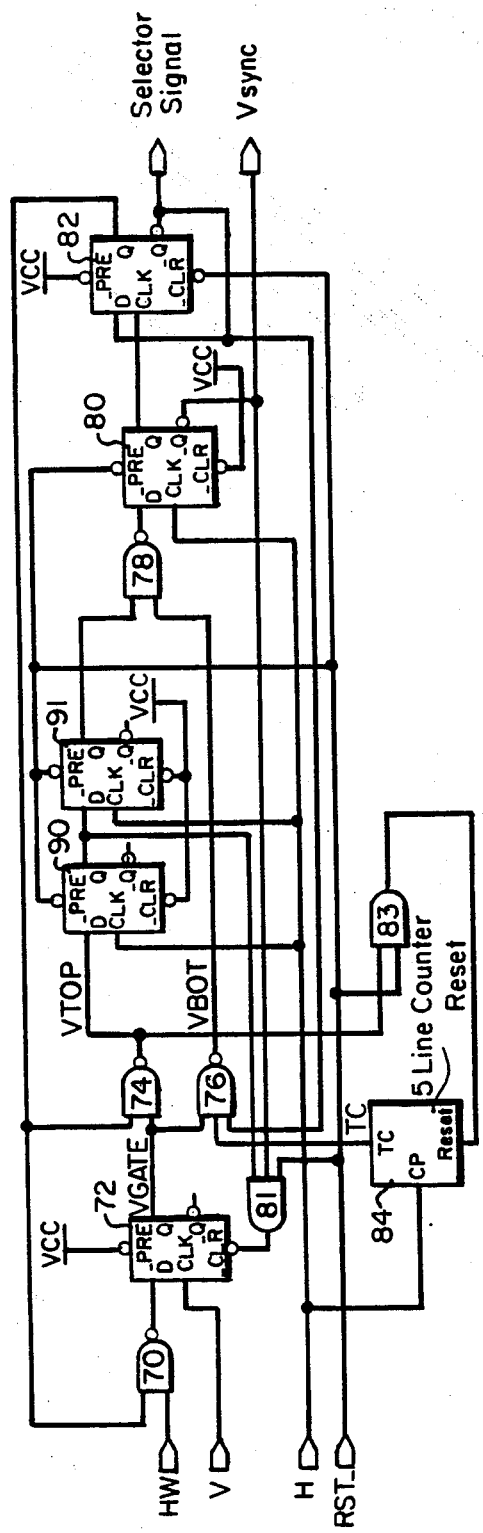
FIG. 9 is an alternative embodiment of a field generator.

An alternative embodiment of the field generator is illustrated in FIG. 9. Corresponding parts of the circuit have the same reference numerals as in FIG. 7.

The main difference between the embodiment of FIG. 9 and that of FIG. 7 is in the timing of the first selector signal, namely initiation of the toggling of flip-flop 80 and 82 during top field. In the embodiment of FIG. 7, the change in the flip-flop is triggered by the horizontal synchronization signal immediately following the vertical synchronization signal. In FIG. 9, triggering of flip-flop 82 is delayed by two counts by means of flip-flops 90 and 91. The top-to-bottom and bottom-to-top transitions of flip-flop 82 will thus occur for the same line in each field. There is no need to preload the top line counter to advance it by two steps for the bottom field relative to the top field.

It is evident from the above descriptions that the field generator of the present invention provides a simple way to process an incoming interlaced signal to preserve the correct spatial and temporal relationship between the two fields without requiring a predetermined one of the fields to be top field and the other to be bottom field. Either field can be top or bottom field.

In addition, the initiation of only one of the fields, here the top field, is dependent on the relative timing of the horizontal and vertical synchronization signals. Artifacts resulting from incorrect interlace due to crossing of the vertical over the horizontal synchronization signal are thus minimized.

Although the invention has been illustrated in a preferred embodiment, it is not to be limited thereto. Other embodiments will be obvious to one skilled in the art and are intended to be encompassed by the following claims.

What is claimed is:

1. Apparatus for recording in a memory an interlaced input signal having an input even field, an input odd field, an even field vertical synchronization signal and even field horizontal synchronization signals associated with said even field, and an odd field vertical synchronization signal and odd field horizontal synchronization signals associated with said odd field, comprising
    input means for receiving said interlaced signal;
    first means connected to said input means and responsive at least in part to said vertical synchronization signals for generating field signals selecting one of said fields as output top field and the other of said fields as output bottom field; and
    timing means connected to said first means and responsive at least in part to said horizontal synchronization signals for generating a first selector signal indicative of the presence of an output top field and a second selector signal indicative of the presence of an output bottom field, respectively, in response to said field signals.

2. Apparatus as set forth in claim 1, wherein said field signals comprise a first field signal selecting the then present field as top field and a second field signal selecting the next following field as bottom field;
    and wherein said timing means generates said first selector signal in response to said first field signal and said second selector signal in response to said second field signal.

3. Apparatus as set forth in claim 2, further comprising means for applying said second selector signal to said first means, so that said first means furnishes said first field signal only in response to a vertical synchronization signal received in the presence of said second selector signal.

4. Apparatus as set forth in claim 3, further comprising counting means having a clock input, a reset input and a terminal count output furnishing a terminal count signal upon receipt of a predetermined number of horizontal synchronization signals following reset of said counting means;
    first connecting means for connecting said first means to said reset input for resetting said counting means in response to said first field signal; and
    means for applying said horizontal synchronization signals to said clock input.

5. Apparatus as set forth in claim 4, wherein said first means comprises gating means having a gating input for generating said second field signal in response to a gating signal at said gating input;
    and means for connecting said terminal count output of said counting means to said gating input so that said second field signal occurs upon receipt of said terminal count signal.

6. Apparatus as set forth in claim 5, wherein said terminal count signal is furnished at a count of 5.

7. Apparatus as set forth in claim 1, wherein said timing means comprises means for furnishing a regenerated vertical synchronization signal in response to each of said field signals and for terminating each of said regenerated vertical synchronization signals following receipt of a predetermined number of horizontal synchronization signals.

8. Apparatus as set forth in claim 7, wherein said timing means further comprises flip-flop means having a Q output having a first state furnishing said first selector signal and a second state furnishing said second selector signal, and a clock input receiving said regenerated vertical synchronization signal, whereby said state of said Q output of said flip-flop means changes in response to said regenerated vertical synchronization signal.

9. Apparatus as set forth in claim 4, wherein said interlaced input signal is a television signal.

10. Apparatus as set forth in claim 9, wherein each of said fields of said television signal comprises a first plurality of lines, said first plurality of lines comprising a second plurality of lines having video information to be displayed;
    further comprising top line counter means connected to said timing means, for counting horizontal synchronization signals following receipt of each of said selector signals and generating a top line signal when the count on said top line counter means is indicative of the presence of the first of said second plurality of lines.

11. Apparatus as set forth in claim 9, wherein said television signal has an NTSC format and wherein said counting means counts to a count of 5.

12. Apparatus as set forth in claim 9, wherein said television signal has a PAL format and said counting means counts to a count of 5.

13. Apparatus as set forth in claim 4, wherein said even field and said odd field each comprises a plurality of lines;
    further comprising horizontal window signal furnishing means for generating a horizontal window having a first value for a first predetermined time period including occurrence of a horizontal synchronization signal in each of said lines, and a second value for the remainder of each of said lines;
    further comprising means for blocking said vertical synchronization signals from said first means while said horizontal window signal has said first value during said output bottom field, and for transmitting the remaining ones of said vertical synchronization signals thereby generating VGATE signals.

14. Apparatus as set forth in claim 13, wherein said blocking means comprises a NAND gate.

15. Apparatus as set forth in claim 13, further comprising means connected to said blocking means for applying said VGATE signals to said first means for gating said first selector signal and said terminal count signal.

16. Apparatus as set forth in claim 15, wherein said first selector signal and said second selector signal together constitute a binary field signal having a first value constituting said first selector signal and a second value constituting said second selector signal.

17. Method for generating a first selector signal selecting an even field or an odd field of an input interlaced signal as top field and a second selector signal selecting the other of said even field and said odd field as bottom field, said even field and said odd field having, respectively, even field and odd field vertical synchronization signals, each of said vertical synchronization signals having a sequence of horizontal synchronization signals associated therewith, comprising the steps of separating said even and odd input vertical synchronization signals and said associated horizontal synchronization signals from said even and odd fields;

generating a first regenerated vertical synchronization signal in response to said even field input vertical synchronization signal or said odd field input vertical synchronization signals and a predetermined one of the sequence of horizontal synchronization signals associated therewith;

generating a second regenerated vertical synchronization signal in response to the other of said input vertical synchronization signals and a selected one of said sequence of horizontal synchronization signals associated therewith; and generating said first selector signal and said second selector signal in response to said first and second regenerated vertical synchronization signal, respectively.

18. The method as set forth in claim 17, wherein said second regenerated vertical synchronization signal is substantially equal to said first regenerated vertical synchronization signal and alternates therewith in time.

19. The method as set forth in claim 18, wherein said first regenerated vertical synchronization signal is generated in response to said even field vertical synchronization signal and said second regenerated vertical synchronization signal is generated in response to said odd field vertical synchronization signal, whereby said even field constitutes top field and said odd field constitutes bottom field.

20. A method as set forth in claim 19, wherein said predetermined one of said sequence of associated horizontal synchronization signals is the horizontal synchronization signal immediately following said even field vertical synchronization signal.

21. A method as set forth in claim 20, wherein said preselected one of said input horizontal synchronization signals is a second horizontal synchronization signal other than the input horizontal synchronization signal immediately following said odd field input vertical synchronization signal.

22. A method as set forth in claim 21, further comprising the step of counting horizontal synchronization signals repetitively from a first count to a terminal count in response to a reset signal;

generating said reset signal in response to said even field horizontal synchronization signal immediately following said even field vertical synchronization signal; and wherein said preselected one of said sequence of odd field horizontal synchronization signals is the odd field horizontal synchronization signal immediately following said terminal count.

23. A method as set forth in claim 18, further comprising window signal generating means for generating a window signal blocking vertical synchronization signals occurring within a predetermined time frame around a horizontal synchronization signal; and further comprising the step of generating said first regenerated vertical synchronization signal in response to said odd field vertical synchronization signal and said second regenerated vertical synchronization signal in response to a subsequent even field vertical synchronization signal, whereby said odd field constitutes top field and said even field constitutes bottom field when said even field vertical synchronization signal occurs within said time frame.

24. A method as set forth in claim 18, wherein said input signal is a received signal having an information content;

further comprising the step of storing said information content in memory at least in part under control of said first selector signals.

25. A method as set forth in claim 18, wherein said input interlaced signal is stored in memory;

further comprising the step of reading said input interlaced signal from memory at least in part under control of said first selector signal.

26. Apparatus for reading from a memory an interlaced input signal having an input even field, an input odd field, an even field vertical synchronization signal and even field horizontal synchronization signals associated with said even field, and an odd field vertical synchronization signal and odd field horizontal synchronization signals associated with said odd field, comprising readout means for reading said interlaced signal from said memory;

first means responsive at least in part to said vertical synchronization signals for generating field signals selecting one of said fields as output top field and the other of said fields as output bottom field; and timing means connected to said first means and responsive at least in part to said horizontal synchronization signals for generating a first selector signal indicative of the presence of an output top field and a second selector signal indicative of the presence of an output bottom field, respectively, in response to said field signals.

27. Apparatus receiving at least a first and second interlaced signal each having a first field interlaced with a second field and having, respectively, first and second synchronization signals, for furnishing a first and second display, respectively, in response thereto, comprising:

first means for arbitrarily selecting one of said interlaced fields of said first signal as first top field, and the other of said fields as first bottom field;

memory means;

second means for recording said first top field and said first bottom field in said memory means under control of said first synchronization signals, thereby creating a stored top field and a stored bottom field, respectively;

display means; and third means for reading said stored top field and said stored bottom field from said memory means under control of said second synchronization signals and in conjunction with said second signal so that a first display and a second display, corresponding, respectively to said first signal and said second signal, are created on said display means.

28. Apparatus as set forth in claim 27, wherein said first synchronization signals comprise first vertical synchronization signals and first horizontal synchronization signals;

wherein said first means comprises means for generating a top field signal indicative of top field in response to a vertical synchronization signal followed by a horizontal synchronization signal of said first or said second interlaced signal, and counting means reset in response to said top field signal for counting horizontal synchronization signals, and for generating a bottom field signal indicative of bottom field upon receipt of the subsequent one of said vertical synchronization signals and a predetermined count on said counting means.

* * * * *